United States Patent
Shimizu

(10) Patent No.: US 10,024,688 B2
(45) Date of Patent: Jul. 17, 2018

(54) ANGLE DETECTION DEVICE AND ANGLE DETECTION METHOD

(71) Applicant: Fumihiro Shimizu, Kanagawa (JP)

(72) Inventor: Fumihiro Shimizu, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 659 days.

(21) Appl. No.: 14/509,343

(22) Filed: Oct. 8, 2014

(65) Prior Publication Data
US 2015/0112634 A1  Apr. 23, 2015

(30) Foreign Application Priority Data

Oct. 21, 2013 (JP) .................. 2013-218630

(51) Int. Cl.
*G06F 19/00* (2018.01)
*G01D 3/036* (2006.01)
*G01D 5/14* (2006.01)

(52) U.S. Cl.
CPC ............. *G01D 3/036* (2013.01); *G01D 5/145* (2013.01)

(58) Field of Classification Search
CPC .............. G01N 2201/12; G01N 21/359; A61B 5/14546
USPC ......................................... 702/151, 182–185
See application file for complete search history.

(56) References Cited

U.S. PATENT DOCUMENTS

| | | | |
|---|---|---|---|
| 2006/0010457 A1 | 1/2006 | Ohno et al. | |
| 2010/0007340 A1* | 1/2010 | Kaita | G01D 5/145 324/207.25 |
| 2010/0026282 A1* | 2/2010 | Kaita | G01B 7/30 324/207.25 |
| 2010/0117576 A1 | 5/2010 | Shimizu | |
| 2010/0188031 A1 | 7/2010 | Shimizu | |
| 2011/0089874 A1 | 4/2011 | Shimizu | |
| 2012/0139532 A1* | 6/2012 | Ueda | G01D 5/2448 324/207.22 |

(Continued)

FOREIGN PATENT DOCUMENTS

| | | |
|---|---|---|
| JP | 02-051019 A | 2/1990 |
| JP | 2002-318138 A | 10/2002 |

(Continued)

OTHER PUBLICATIONS

U.S. Appl. No. 14/315,614, filed Jun. 26, 2014.
Office Action dated Aug. 1, 2017 in Japanese Patent Application No. 2013-218630.

*Primary Examiner* — Edward Raymond
(74) *Attorney, Agent, or Firm* — Oblon, McClelland, Maier & Neustadt, L.L.P.

(57) ABSTRACT

An angle detection device which includes multiple sensors to output multiple sinusoidal signals having different phases according to the rotation angle of a rotating body; a rotation calculation device to detect the rotation angle based on the multiple sinusoidal signals and detect an amplitude of the multiple sinusoidal signals to output the amplitude of the multiple sinusoidal signals as amplitude signal; and an amplitude comparison device to compare the amplitude signal with a predetermined amplitude target value and output an amplitude error signal indicating the comparison result; wherein the error of amplitude of the multiple sinusoidal signals is corrected by increasing or decreasing a drive input of a sensor driving unit based on the amplitude error signal.

20 Claims, 11 Drawing Sheets

(56) References Cited

U.S. PATENT DOCUMENTS

| | | |
|---|---|---|
| 2013/0099708 A1 | 4/2013 | Shimizu et al. |
| 2013/0106326 A1 | 5/2013 | Kamatani et al. |
| 2013/0106327 A1 | 5/2013 | Kamatani et al. |
| 2013/0218517 A1* | 8/2013 | Ausserlechner ......... G01B 7/30 702/151 |
| 2013/0325187 A1 | 12/2013 | Shimizu et al. |

FOREIGN PATENT DOCUMENTS

| | | |
|---|---|---|
| JP | 2005-043228 | 2/2005 |
| JP | 2013-99023 A | 5/2013 |
| JP | 2013-108971 A | 6/2013 |

\* cited by examiner

WHEN Dint[*]=0

WHEN Dint[*]=1

ANGLE DETECTION DEVICE AND ANGLE DETECTION METHOD

CROSS-REFERENCE TO RELATED APPLICATION

This patent application is based on and claims priority pursuant to 35 U.S.C. § 119 to Japanese Patent Application No. 2013-218630 on Oct. 21, 2013 in the Japan Patent Office, the entire disclosure of which is hereby incorporated by reference herein.

BACKGROUND

Technical Field

The present invention relates to an angle detection device and an angle detection method.

Background Art

To detect the rotation angle of a rotating body, a method and a device are known in which a magnetic sensor is fixed closely to a rotating body to which a permanent magnet is provided and relatively rotated with the rotating body to detect the rotation angle thereof based on the output waveform of the magnetic sensor that changes with the rotation.

However, the detection accuracy by these tends to deteriorate unless care is taken about selection based on the sensitivity of a magnetic sensor, improvement of accuracy of magnetization of a permanent magnet, highly precise arrangement of a magnet sensor, etc.

In attempts to prevent such deterioration, a digital angle measuring system is known which includes a control circuit to detect an amplitude of a magnetic sensor output signal and calculate an amplification ratio to correct the detected amplitude to a desired value, an AD converter to convert the magnetic sensor output signal to digital data, and a variable amplifier using an operational amplifier to amplify the output signal of the magnetic sensor based on the amplification ratio to control the amplitude of the amplified output signal of the magnetic sensor to be input to the AD converter.

However, the variable amplifier of this digital angle measuring system is configured using an operational amplifier, it is necessary to cancel input offset of the operational amplifier, which degrades angle detection precision. That is, if a gain is multiplied with a sinusoidal signal by an amplifier, offset of the amplifier is added to the sine waveform, which makes another factor of error.

For this reason, in this digital angle measuring system, a chopper switch is arranged just before the variable amplifier and, a chopper demodulator, just after the variable amplifier. This arrangement increases cost.

SUMMARY

The present invention provides an improved angle detection device which includes multiple sensors to output multiple sinusoidal signals having different phases according to the rotation angle of a rotating body; a rotation calculation device to detect the rotation angle based on the multiple sinusoidal signals and detect the amplitude of the multiple sinusoidal signals to output the amplitude of the multiple sinusoidal signals as amplitude signal; and an amplitude comparison device to compare the amplitude signal with a predetermined amplitude target value and output an amplitude error signal indicating a comparison result; wherein the error of amplitude of the multiple sinusoidal signals is corrected by increasing or decreasing a drive input of a sensor driving unit based on the amplitude error signal.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

The present invention is to provide an angle detection device and an angle detection method which are capable of detecting a rotation angle of a rotating body without cost increase and errors, by increasing and decreasing a drive voltage of a Hall element to correct the error of amplitude of an output signal with no additional circuit provided unlike conventional technologies.

The present invention is an angle detection device which includes multiple sensors to output multiple sinusoidal signals having different phases according to a rotation angle of a rotating body; a rotation calculation device to detect the rotation angle based on the multiple sinusoidal signals and detect an amplitude of the multiple sinusoidal signals to output the amplitude of the multiple sinusoidal signals as an amplitude signal; and an amplitude comparison device to compare the amplitude signal with a predetermined amplitude target value and output an amplitude error signal indicating a comparison result; wherein an error of amplitude of the multiple sinusoidal signals is corrected by increasing or decreasing a drive input of a sensor driving unit based on the amplitude error signal.

Embodiments of the angle detection device of the present disclosure are described with reference to the accompanying drawings.

First Embodiment

Figure 1:
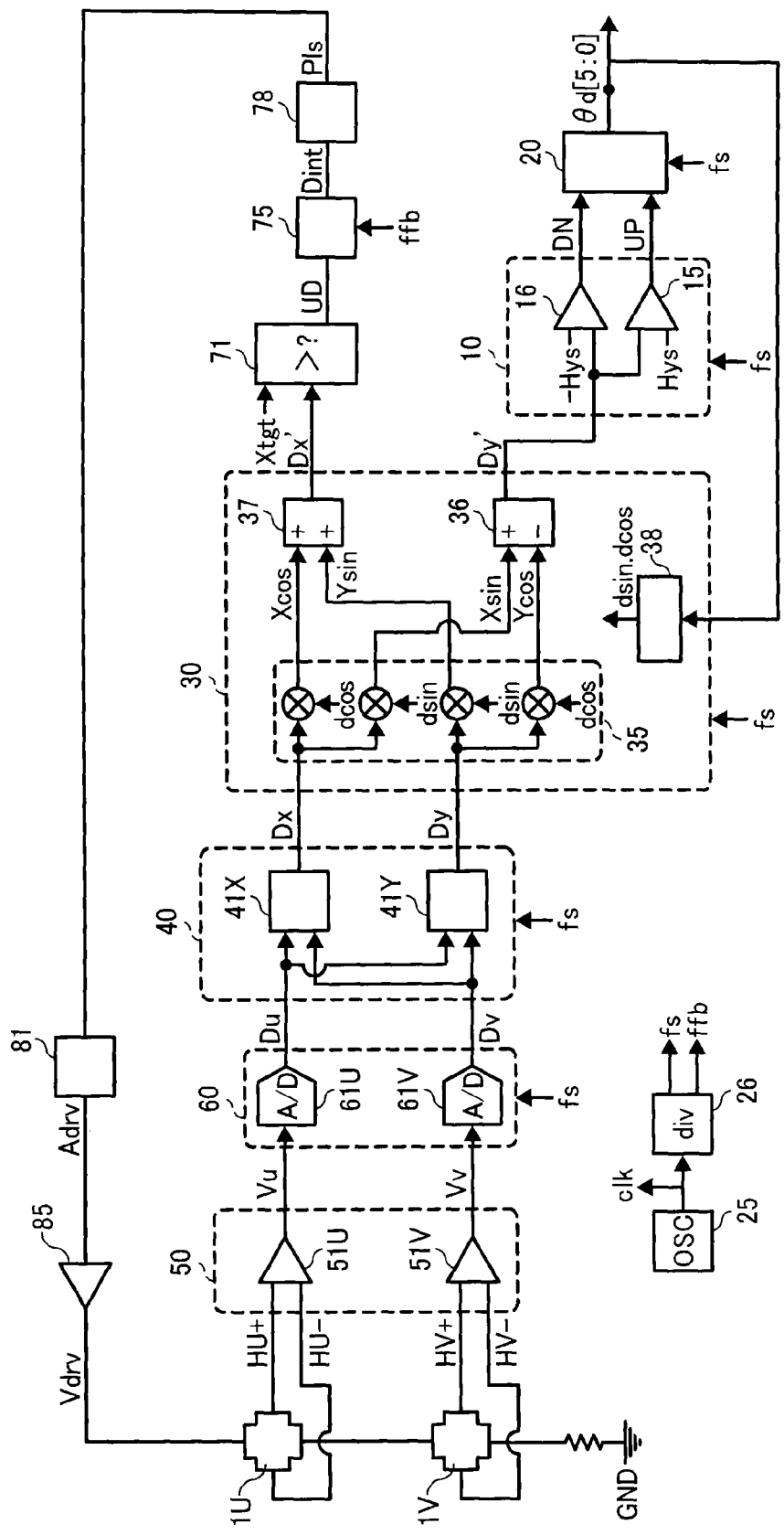
FIG. 1 is a schematic block diagram illustrating an angle detection device according to a first embodiment of the present disclosure.
Figure 2:
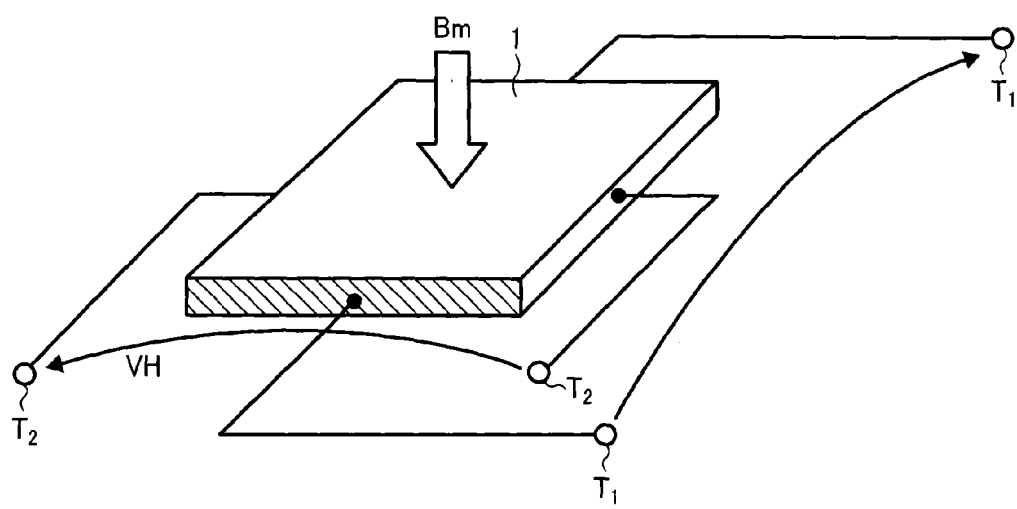
FIG. 2 is a diagram illustrating the operating principle of Hall elements.

FIG. 1 is a schematic block diagram illustrating the angle detection device according to the first embodiment of the present disclosure. FIG. 2 is a diagram illustrating the operating principle of Hall elements. First, the operation principle of a magnetic sensor using Hall elements is described with reference to FIG. 2 and mathematical expression 1.

As illustrated in FIG. 2, a Hall element 1 is a sheet formed of semiconductor materials, to which a pair of terminals $T_1$ and another pair of terminals $T_2$ are provided at both ends along the two orthogonal directions. When a Hall element drive voltage Vin is applied between the pair of terminals $T_1$ and a magnetic field having a magnetic flux density Bm is applied in the direction perpendicular to both of the two orthogonal directions, a Hall element output voltage VH is generated between the another pair of terminals $T_2$.

The Hall element output voltage VH at this point in time can be expressed by the following Equation 1 by a proportionality factor Kh, carrier mobility μh, magnetic flux density Bm, and Hall element drive voltage Vin.

$$VH = Kh * \mu h * Bm * Vin \qquad \text{Equation 1}$$

As seen in the Equation 1, the Hall element output voltage VH is in proportion to the Hall element drive voltage Vin. The carrier mobility μh significantly varies depending on temperature but in general temperature change is sufficiently slow in comparison with the operation of amplitude correction of sinusoidal signals in the angle detection device described later. For this reason, the temperature is considered as constant.

The operation principle of the Hall element 1 is as described above.

Next, each element of the angle detection device of the present embodiment is described with reference to FIG. 1.

First, Hall elements 1U and 1V are described. The Hall elements 1U and 1V in the angle detection device of the present embodiment are magnetic sensor elements arranged close to a rotating body having a permanent magnet, which is the same as conventional. Each of the Hall elements 1U and 1V has two pairs of terminals as described above. A Hall element drive voltage Vin is applied to one of the two pairs and a Hall element output voltage (output signal) VH is output from the other pair. In this embodiment, the pair of the Hall elements 1U and 1V are arranged with a phase difference of 120° to each other to detect the rotation angle of a rotating body.

The output signal from the Hall element 1U is U phase differential signal HU+ and HU− and the difference is expressed by the sine wave represented by the higher part of the Equation 2 about the rotation angle θ of the rotating body according to the change of the magnetic field by the permanent magnet. In addition, as described in the operation principle of Hall element, its amplitude Au is in proportion to a drive voltage Vdrv, which is a voltage to drive a Hall element.

$$\begin{cases} Vu = (HU+) - (HU-) = Au * \sin\left(\theta + \frac{\pi}{3}\right) \\ Vv = (HV+) - (HV-) = Av * \sin\left(\theta - \frac{\pi}{3}\right) \end{cases} \qquad \text{Equation 2}$$

The Hall element 1V is arranged with a phase difference of 120° with respect to the Hall element 1U and has the same structure as the Hall element 1U. V-phase differential signals HV+ and HV− to be output are represented by the sine waveform represented by the lower part of Equation 3.

Figure 3:
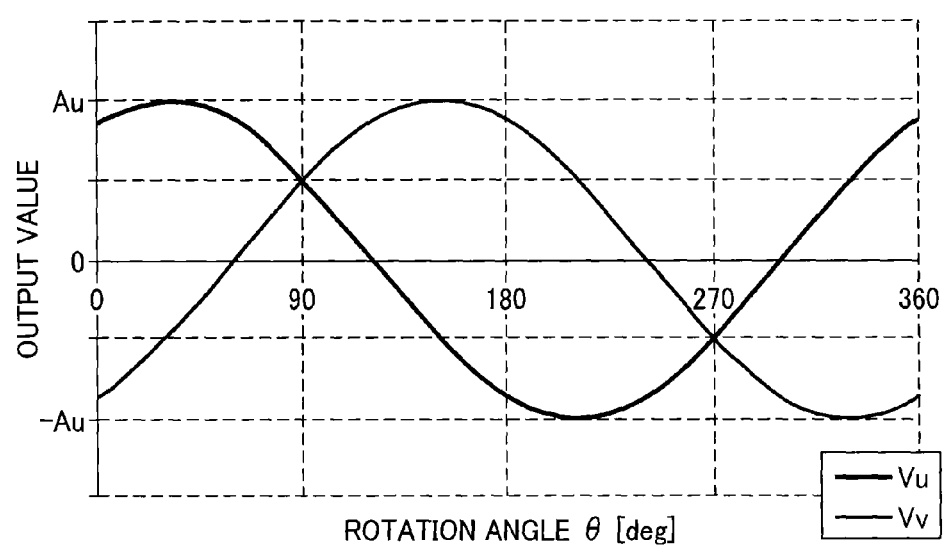
FIG. 3 is a diagram illustrating sinusoidal signals Vu and Vv of U phase and V phase of Hall elements.

FIG. 3 is a diagram illustrating sinusoidal signals Vu and Vv of U phase and V phase of the Hall elements 1U and 1V.

In this description of the present embodiment, the amplitudes Au and Av of the two signals in the Equation 2 are regarded as equal. In addition, the Hall elements 1U and 1V of the present embodiment correspond to the multiple sensors in the present disclosure.

The differential unit 50 includes a U-phase differential unit 51U and a V-phase differential unit 51V.

The U phase differential unit 51U is a subtractor to execute the differential calculation expressed by the higher part of the Equation 2 to output the calculation result. That is, the U phase differential signals HU+ and HU− as the output signal of the Hall element 1U are single-ended and output as U phase sine wave signal Vu.

The V phase differential unit 51V is a subtractor to execute the differential calculation expressed by the lower part of the Equation 2 to output the calculation result. That is, the V phase differential signals HV+ and HV− as the output signal of the Hall element 1V is single-ended and output as V phase sine wave signal Vv.

An oscillator 25 outputs a clock clk that is a periodic pulse signal.

A frequency divider 26 divides the frequency of the clock clk and outputs a trigger fs and integration trigger ffb. The frequency of the integration trigger ffb is set to be sufficiently slower than that of the trigger fs.

An AD conversion unit 60 includes a U phase AD conversion unit 61U and V phase AD conversion unit 61V. A U phase AD conversion unit 61U conducts analog/digital conversion to U phase sinusoidal signal Vu as output of a U phase differential unit 51 U every time the trigger fs arrives from a frequency divider 26 and outputs the digital data after conversion as U phase sinusoidal data Du. The relation between the U phase sinusoidal signal Vu and the U phase sinusoidal data Du is represented by the higher part of the Equation 3 using a predetermined AD conversion coefficient Kad.

Incidentally, the values of the U phase sinusoidal signal Vu not greater than quantization resolution are truncated or integrated and carried to the integer unit.

$$Du = Kad * Vu$$

$$Dv = Kad * Vv \qquad \text{Equation 3}$$

The V phase AD conversion unit 61V has the same configuration as the U phase AD conversion unit 61U and conducts analog/digital conversion to the V phase sinusoidal signal Vv as the output of the V phase differential unit 51 V every time the trigger fs arrives and outputs the digital data as the V phase sinusoidal data Dv.

It is also possible that the U phase AD conversion unit 61U and the V phase AD conversion unit 61V can be a configuration of a single AD conversion unit based on time-sharing.

A vector generating unit 40 generates X axis data Dx and Y axis data Dy as the two orthogonal signals based on the two sinusoidal data Du and Dv after the AD conversion described above.

Below is the description about the configuration of the vector generating unit 40.

An X axis data generating unit 41X is a subtractor including a multiplying factor. The X axis data generating unit 41X conducts subtraction according to the higher part of the Equation 4 for the two sinusoidal data Du and Dv after completion of AD conversion by the AD conversion units 61U and 61V upon arrival of the trigger fs and thereafter outputs the calculation results as the X axis data Dx.

$$\begin{cases} Dx = (Du - Dv)/\sqrt{3} = Dau*\cos(\theta) \\ Dy = Du + Dv = Dau*\sin(\theta) \end{cases} \quad \text{Equation 4}$$

$$Dau = Kad*Au$$

When $Au$ is $Av$

A Y axis data generating unit 41Y is an adder. The Y axis data generating unit 41Y conducts addition according to the lower part of the Equation 4 for the two sinusoidal data Du and Dv after completion of AD conversion by the AD conversion units 61U and 61V upon arrival of the trigger fs and thereafter outputs the calculation results as the Y axis data Dy.

Figure 4:
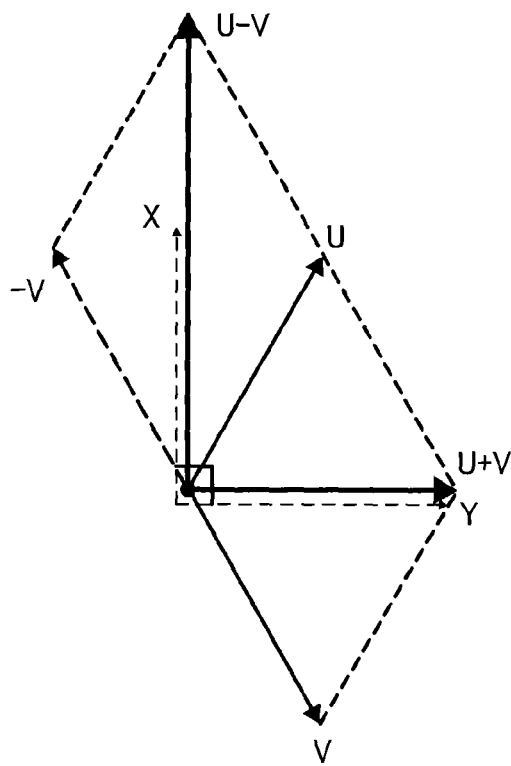
FIG. 4 is a diagram illustrating conversion of sinusoidal signals Vu and Vv of UV phases as output signals of Hall elements from a UV axis to an XY axis.
Figure 5:
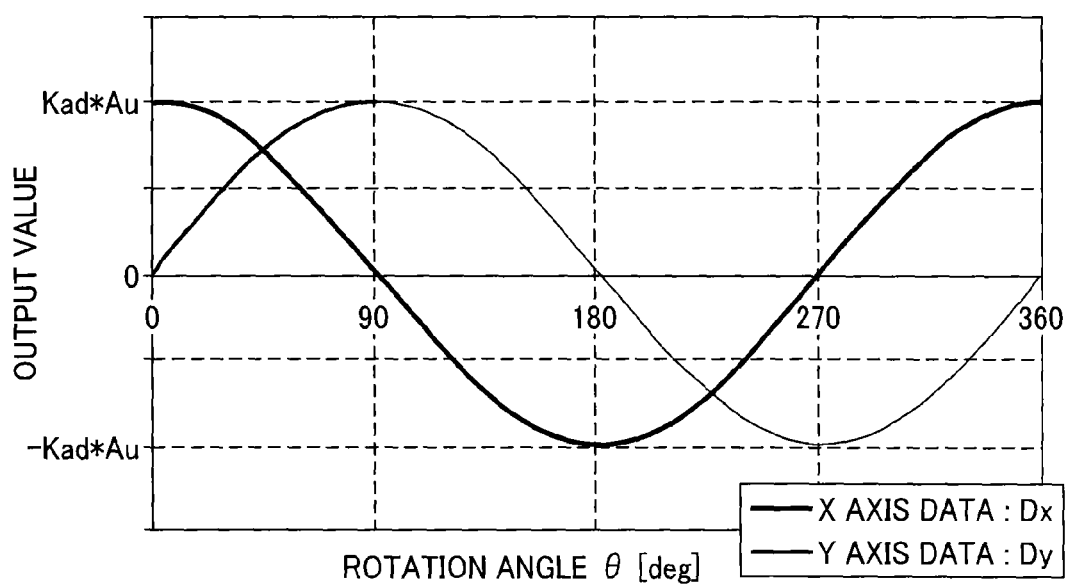
FIG. 5 is a diagram illustrating the relation between the rotation angle θ and output values of X axis data Dx and Y axis data Dy.

The vector generating unit 40 conducts axis conversion illustrated in FIG. 4 (diagram illustrating conversion from UV axes to XY axes of the sinusoidal signals Vu and Vv of the UV phase, which are the output signals of Hall elements) to generate X axis data (signal) Dx and Y axis data (signal) Dy. The X axis data Dx and the Y axis data Dy become orthogonal waveforms (sine wave and cosine wave) having amplitudes of Kad×Au as shown in the Equation 4 and illustrated in FIG. 5 illustrating the relation between the rotation angle θ of X axis data Dx and Y axis data Dy and the output value.

As described above, the vector generating unit 40 generates two orthogonal signal data Dx and Dy from the two sinusoidal data Du and Dv with a phase difference of 120°.

However, it is also possible to generate the data by addition and subtraction of two or more sinusoidal data if the two orthogonal signal data Dx and Dy are obtained.

Alternatively, if the sinusoidal data Du and Dv are originally orthogonal, it is possible to use them as the X axis data and Y axis data while having no vector generating unit 40.

The vector generating unit 40 in this embodiment corresponds to the vector generating device in the present disclosure.

A rotation calculating unit 30 includes a multiplier 35, a subtractor 36, an adder 37, and a memory 38, conducts rotation conversion on a vector represented by the X axis data Dx and the Y axis data Dy in accordance with the value of detected angle data θd to be described later, and outputs a rotation vector represented by rotated X axis data Dx' and rotated Y axis data Dy' obtained as the calculation result.

After the trigger fs arrives and X axis data Dx and Y axis data Dy are updated by the X axis data generating unit 41X and the Y axis data generating unit 41Y, the X axis data Dx or the Y axis data Dy and sinusoidal data d sin or cosinusoidal data d cos are multiplied in combination to output the four multiplication results X cos, Y sin, X sin, and Y cos shown by the Equation 5.

$$\begin{cases} X\sin = Dx*d\sin \\ Y\cos = Dy*d\cos \\ X\cos = Dx*d\cos \\ Y\sin = Dy*d\sin \end{cases} \quad \text{Equation 5}$$

After the trigger fs arrives and the multiplication results of X sin and Y cos are updated by the multiplier 35, the subtractor 36 conducts subtraction of the multiplication results X sin and Y cos (which is –X sin+Y cos), to output the calculation results as the rotated Y axis data Dy'.

After the trigger fs arrives and the multiplication results of X cos and Y sin are updated by the multiplier 35, the adder 37 conducts addition of the multiplication results X cos and Y sin (which is X cos+Y sin), to output the calculation results as the rotated X axis data Dx'.

$$\begin{cases} Dx' = X\cos + Y\sin \\ Dy' = -X\sin + Y\cos \end{cases} \quad \text{Equation 6}$$

Figure 6:
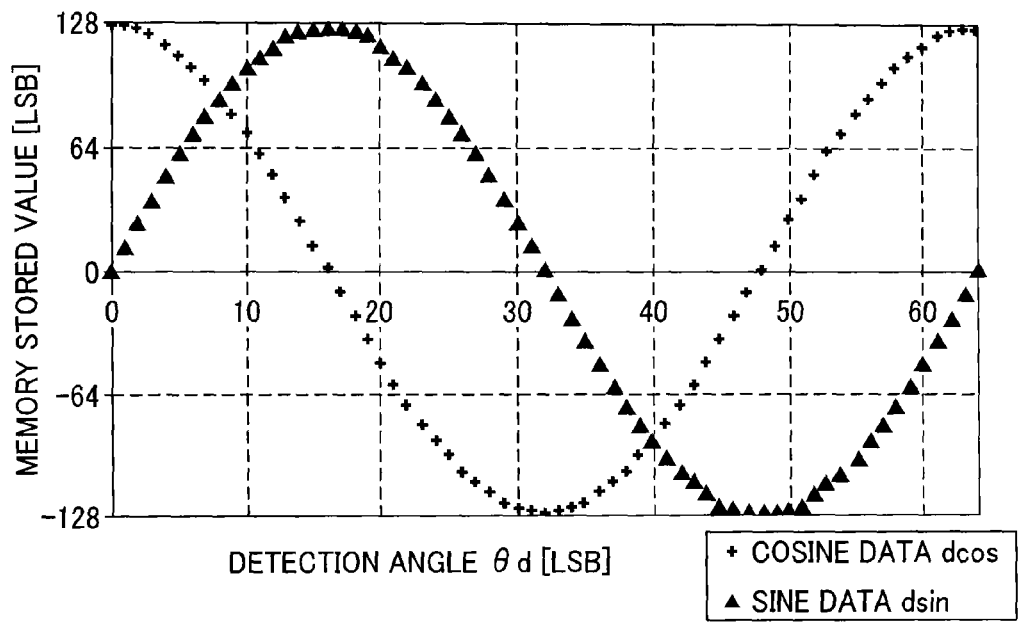
FIG. 6 is a diagram illustrating sine data and cosine data stored in a memory.

The memory 38 is a non-volatile memory to store therein sine data d sin and cosine data d cos, in each of which one cycle is divided into 64 parts and the amplitude is represented by 127 lower sideband (LSB) and output corresponding data values (memory stored value) according to the value of the detected angular data θd with a 6-bit word length, which is described later, as illustrated in FIG. 6 (indicating sine data and cosine data stored in the memory).

The rotation calculating unit 30 is as described above.

The rotation calculating unit 30 in this embodiment corresponds to the vector rotation device in the present disclosure.

Figure 7:
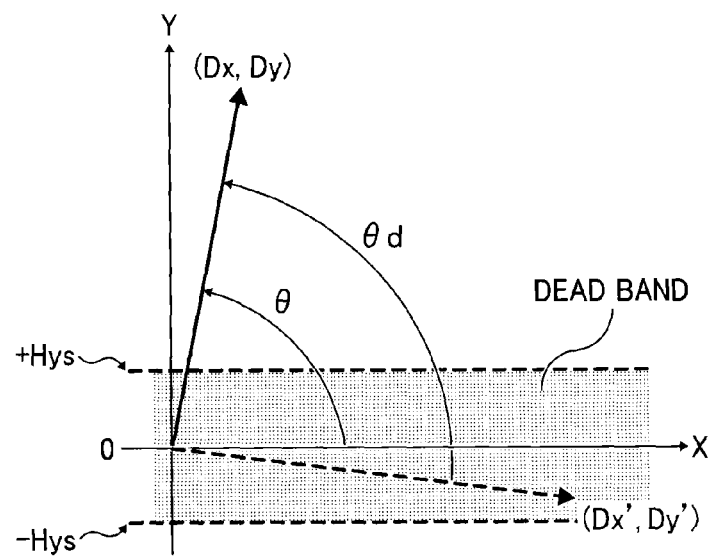
FIG. 7 illustrates tracking of the X axis by vector rotation and illustrates a deadband.

The sign determining unit 10 determines whether a rotated vector represented by the rotated X axis data Dx' and the rotated Y axis data Dy' is above (corresponding to +) or below (corresponding to –) deadband with a width of (2×Hys) corresponding to a predetermined reference angle provided sandwiching X axis (Dy'=0) serving as a target of rotation as illustrated in FIG. 7 and outputs the result of the determination as an upside determination signal UP or a downside determination signal DN (sign determination process).

The sign determining unit 10 is described next.

After the trigger fs arrives and the rotated Y axis data Dy' is updated by the subtractor 36, an upside determining unit 15 outputs an upside determining signal UP as Hi when the rotated Y axis data D'y is not less than the upside reference value (+Hys) as represented by the Equation 7.

After the trigger fs arrives and the rotated Y axis data Dy' is updated by the subtractor 36, a downside determining unit 16 outputs a downside determining signal DN as Hi when the rotated Y axis data D'y is not greater than the downside reference value (–Hys) as represented by the Equation 8.

The configuration and operation of the sign determining unit 10 are as described above.

The sign determining unit 10 in this embodiment corresponds to the sign determining device in the present disclosure.

$$UP = \begin{cases} Hi & (Dy' \geq Hys) \\ Lo & (Dy' < Hys) \end{cases} \quad \text{Equation 7}$$

$$DN = \begin{cases} Hi & (Dy' \leq -Hys) \\ Lo & (Dy' > -Hys) \end{cases} \quad \text{Equation 8}$$

Figure 10:
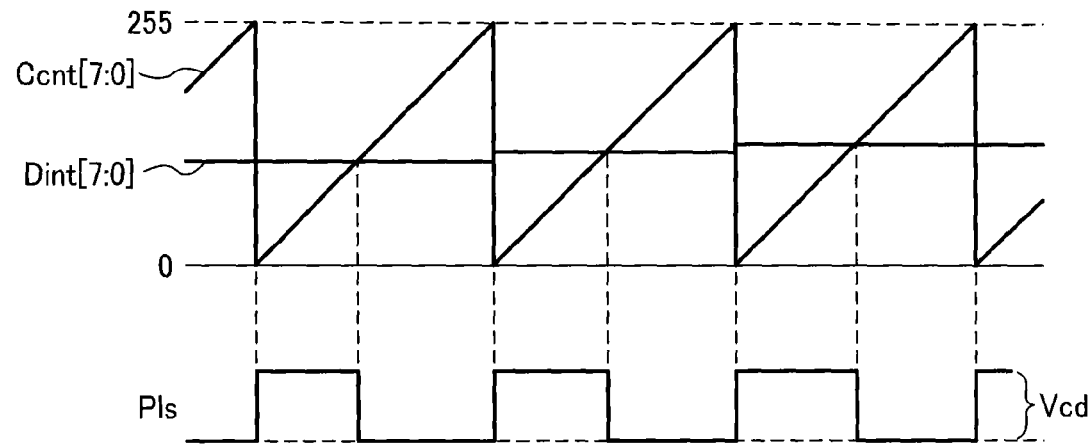
FIG. 10 is a timing diagram illustrating the relation among the integrated value Dint, the carrier count value Cont, and the Pls in the first embodiment.

Next, the operation of an angle counter 20 is described with reference to FIG. 10, which is a timing diagram illustrating the operation of a modulation unit (modulator) 78 in the first embodiment.

The angle counter 20 is a counter repeating count-ups and count-downs with a count width of 6 bits (0 to 63) and outputs the count value as detected angle data θd corresponding to the detected angle single.

Figure 8:
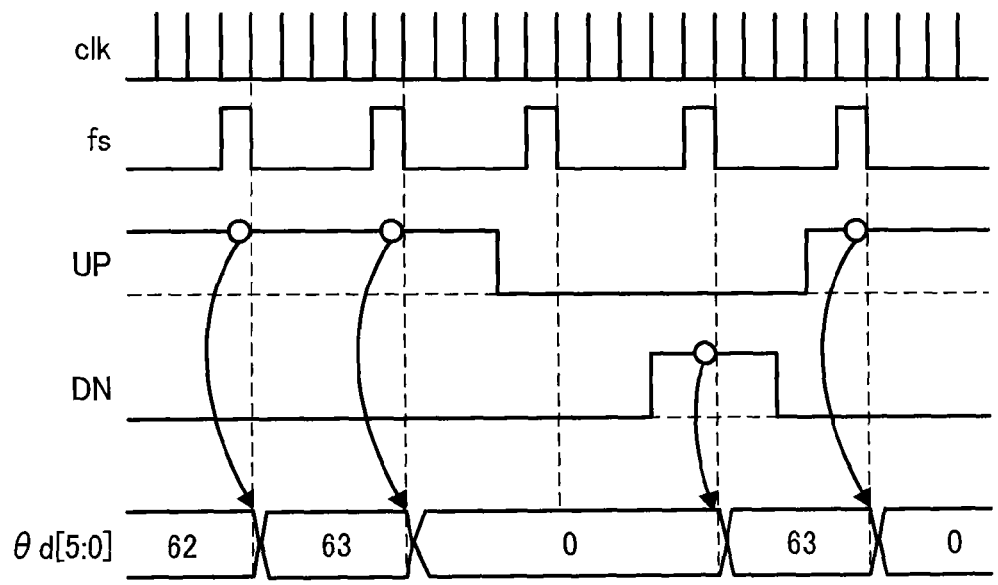
FIG. 8 is a timing diagram illustrating the operation of an angle counter.

After the trigger fs arrives and the sign determining signal UP or DN is updated by the sign determining unit 10 as illustrated in FIG. 8 (timing diagram illustrating the operation of the angle counter), if the logic of the upside determining signal UP is Hi, the detected angle date θd is incremented by one in the counting process of the angle counter 20. If the logic of the downside determining signal DN is Hi, the detected angle date θd is decremented by one.

The two determining signals UP and DN do not become Hi simultaneously because of the setting of an upside reference value (+Hys) and a downside reference value (−Hys).

The detected angle data θd corresponds to the detection value θ of the rotation angle by the angle detection device.

In FIG. 8, the process is executed just after the trigger fs arrives but the actual process execution timing is as described above.

The angle counter 20 is as described above.

The angle counter 20 of this embodiment corresponds to the angle counter in the present disclosure.

Figure 18:
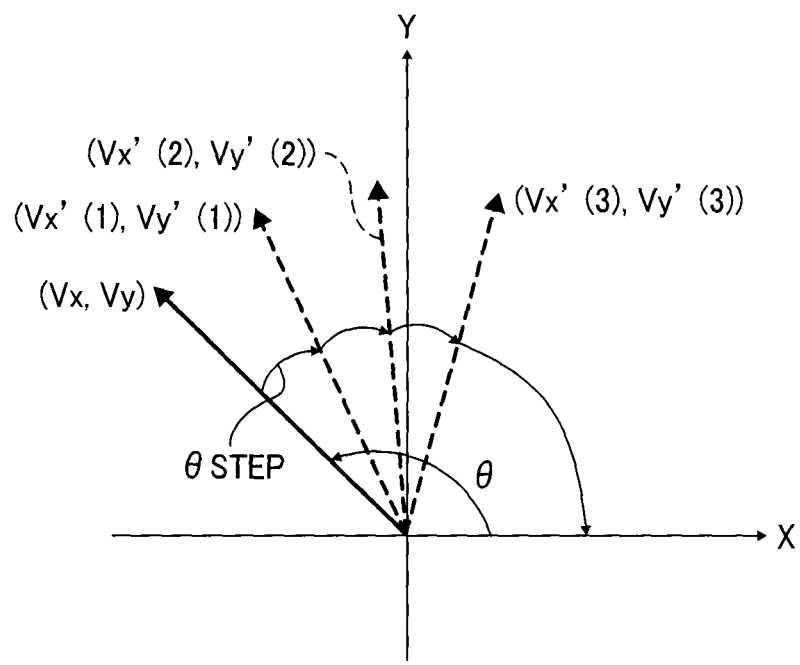
FIG. 18 is a diagram illustrating a sequential rotation of a vector by rotation calculation in a conventional rotation angle detection device.

As described above, the angle detection device of the present embodiment includes the AD conversion unit 60, the vector generating unit 40, the rotation calculating unit 30, the sign determining unit 10, and the angle counter 20, and conducts the counting process of from the analogue-digital conversion to counting process by the angle counter described above between when the trigger fs arrives and when the next trigger fs arrives. By this process, in addition to the detection of the rotation angle of a rotating body in a conventional digital angle measuring system illustrated in FIG. 18, the rotation vector expressed by the rotated X axis data Dx' and the rotated Y axis data Dy' illustrated in FIG. 7 is rotated by one step angle toward X axis serving as the target whenever the trigger fs arrives. After it rotates close to X axis, it always traces to X axis. The amount of rotation from the original vector to the rotated vector is the detected angular data θd, and corresponds to the detection value of the rotation angle θ.

In addition, when the rotation vector is close to X axis, the rotated X axis data Dx' corresponds to the amplitudes Au and Av of the sinusoidal signals Vu and Vv.

Incidentally, arrangement of a deadband near the X axis as illustrated in FIG. 7 makes it possible to prevent chattering, which is frequent repetition of increments and decrements of the detected angle data θd.

The rotation angle detection feature of the present disclosure is as described above and the rotation calculation device in the present disclosure corresponds to the rotation calculation unit 30, the sign determining unit 10, and the angle counter 20 in the present embodiment.

Next, correction of the sinusoidal signals Vu and Vv are described.

As represented by the Equation 9, a comparison unit 71 compares the rotated X axis data Dx' corresponding to the amplitude signal of the present disclosure with the target amplitude Xtgt corresponding to the amplitude target value of the amplitudes of the sinusoidal signals Vu and Vv and outputs the amplitude error signal UD representing the result. That is, when the rotated X axis data Dx' is less than the target amplitude Xtgt, the amplitude error signal UD is set to Hi and outputs Lo when the rotated X axis data Dx' is not less than the target amplitude Xtgt.

The comparison unit 71 in this embodiment corresponds to the amplitude comparison device in the present disclosure.

$$UD = \begin{cases} Hi & (Dx' < Xtgt) \\ Lo & (Dx' \geq Xtgt) \end{cases} \quad \text{Equation 9}$$

Figure 9:
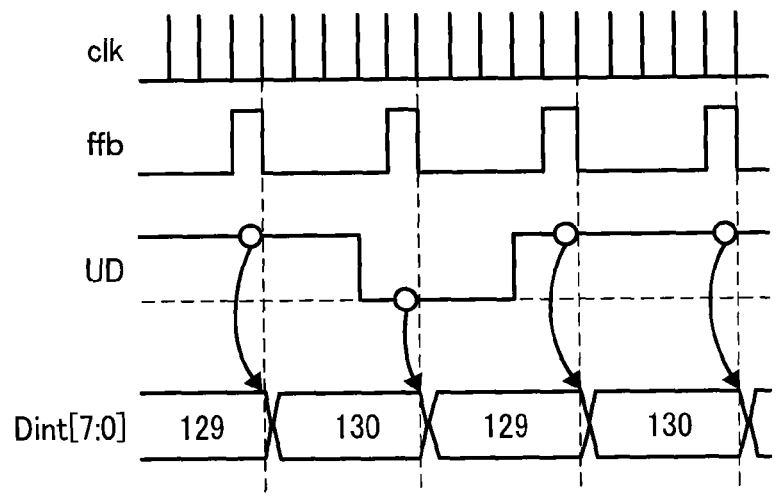
FIG. 9 is a timing diagram illustrating the operation of an integration unit.

An integration unit 75 is a counter with a count width of 8 bits (0 to 255). As illustrated in FIG. 9 (a timing diagram illustrating the operation of the integration unit), whenever the integration trigger ffb arrives, the integration value Dint showing the count value is incremented by one followed by output if the amplitude error signal US is Hi and, if it is Lo, the integration value Dint is decremented by one and thereafter output.

The integration unit 75 in the present embodiment corresponds to the integration device in the present disclosure.

The modulation unit 78 modulates the integrated value Dint as the count value of the integration unit 75 by pulse width and outputs as a pulse signal Pls. As illustrated in FIG. 10 (timing diagram illustrating the relation between the integration value Dint and the carrier count value Ccnt and Pls), a carrier count value Ccnt generated using an 8-bit repetition counter counting up by a particular frequency is compared with the integrated value Dint.

When the integrated value Dint is larger than the carrier count value Ccnt, the pulse signal Pls is set to Hi followed by output or Lo is output when the integrated value Dint is not larger than the carrier count value Ccnt. For this reason, the pulse signal Pls is a pulse signal with a constant frequency as illustrated in FIG. 10 and the Duty of the Hi period is represented by the ratio of the integrated value Dint to the count number (256) of 8-bit count as illustrated in FIG. 10.

The modulation unit 78 of the present embodiment corresponds to the modulation device in the present disclosure.

$$\text{Duty} = Dint/256 \quad \text{Equation 10}$$

A low pass filter (LPF) 81 smooths the pulse signal Pls and outputs it as a drive control signal Adrv. The drive control signal Adrv is represented by the Equation 11 using a Hi level voltage Vcd of the pulse signal Pls. Incidentally, a cut-off frequency is set to sufficiently attenuate the signal of the frequency of the carrier count value Ccnt.

The LPF 81 in the present embodiment corresponds to the smoothing device in the present disclosure.

The drive control signal Adrv obtained by smoothing the pulse signal Pls is referred as integration signal.

$$Adrv = Vcd * \text{Duty} \qquad \text{Equation 11}$$

$$Vdrv = \left(1 + \frac{R02}{R01}\right) * Adrv \qquad \text{Equation 12}$$

Figure 11:
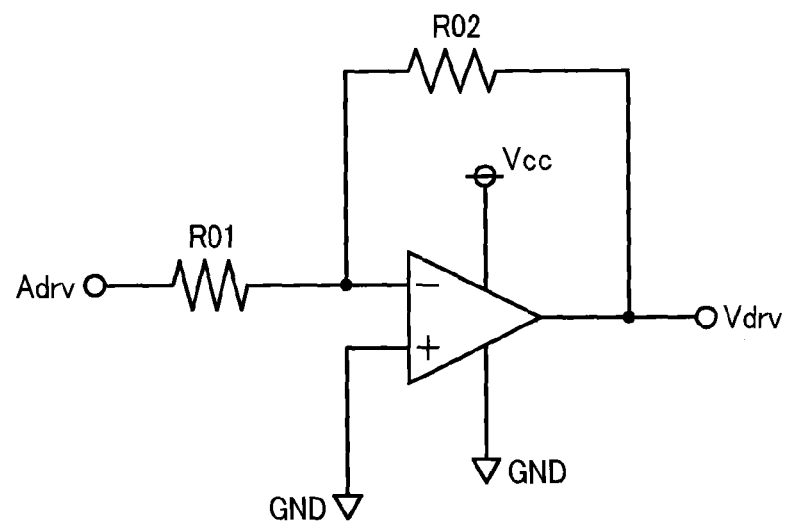
FIG. 11 is a diagram illustrating an example of configuration of the drive unit according to a first embodiment of the present invention.

A drive unit 85 is specifically an amplification circuit illustrated in FIG. 11, which is an example of the configuration in the first embodiment and supplies electricity to drive the Hall elements 1U and 1V. As represented by the Equation 12, a drive voltage Vdrv in proportion to the drive control signal Adrv is applied to the Hall elements 1U and 1V. Incidentally, it is not possible to apply a voltage surpassing the source voltage Vcc.

The drive unit 85 in this embodiment corresponds to the sensor driving device in the present disclosure.

The correction of the amplitudes of the sinusoidal signals Vu and Vv in the present embodiment is as described above. That is, in the present embodiment, the amplitudes of the sinusoidal signals Vu any Vv are detected, the amplitudes of the sinusoidal signals Vu and Vv are compared with the target amplitude Xtgt, the amplitude error signal representing the comparison result is output, the amplitude error is integrated by the integration unit 75, and the drive voltage Vdrv in proportion to the integrated value Dint is applied to the Hall element 1. This corrects the Hall element output, i.e., the amplitudes of the sinusoidal signals Vu and Vv to the target value.

The amplitude correction of the sinusoidal signal in the present embodiment is described next.

That is, if a gain is multiplied with a sinusoidal signal by an amplifier in a conventional digital angle detection system, the offset ofs of the amplifier is added to the sine waveform, which makes another factor of error as represented by the Equation 13.

$$\begin{cases} Vu = Au * \sin\left(\theta + \frac{\pi}{3}\right) + Ofs \\ Vv = Av * \sin\left(\theta - \frac{\pi}{3}\right) + Ofs \end{cases} \qquad \text{Equation 13}$$

$$\begin{cases} Vu = Khu * (Vdrv + Ofs) * \sin\left(\theta + \frac{\pi}{3}\right) \\ Vv = Khv * (Vdrv + Ofs) * \sin\left(\theta - \frac{\pi}{3}\right) \end{cases} \qquad \text{Equation 14}$$

On the other hand, in the present embodiment, the amplitude of a sinusoidal signal is corrected by increasing or decreasing the drive voltage itself of the Hall elements 1U and 1V. Incidentally, as represented by the Equation 14, the offset ofs of the amplifier of the drive unit has an impact on the multiplying factor of a sine waveform. Khu and khv are sensitivity factors of U phase and V phase, respectively. However, since the error of the amplitude is corrected by the amplitude correction of the sinusoidal signal described above, the impact of the offset is prevented with no additional circuit.

As described above, in the present embodiment, based on the integrated value of the errors between the amplitude of a sinusoidal signal and a target amplitude value, the amplitude of the sinusoidal signal is controlled by increasing or decreasing the drive voltage Vdrv of the Hall elements 1U and 1V. This obviates the need of a circuit to cancel an input offset, so that the amplitude mentioned above is inexpensively controlled.

In addition, when the sensitivity of the Hall elements 1U and 1V and the magnetization of a permanent magnet is small, it is possible to prevent a decrease of the amplitude of a sinusoidal signal by increasing or decreasing the drive voltage Vdrv of the Hall elements 1U and 1V, so that the impact of external noises in wiring is significantly reduced. In addition, since the integration device and modulation device are made by simple logic circuits, the amplitude of a sinusoidal signal is inexpensively controlled.

Second Embodiment

Next, the angle detection device of a second embodiment will be described explained with reference to accompanying drawings.

Figure 12:
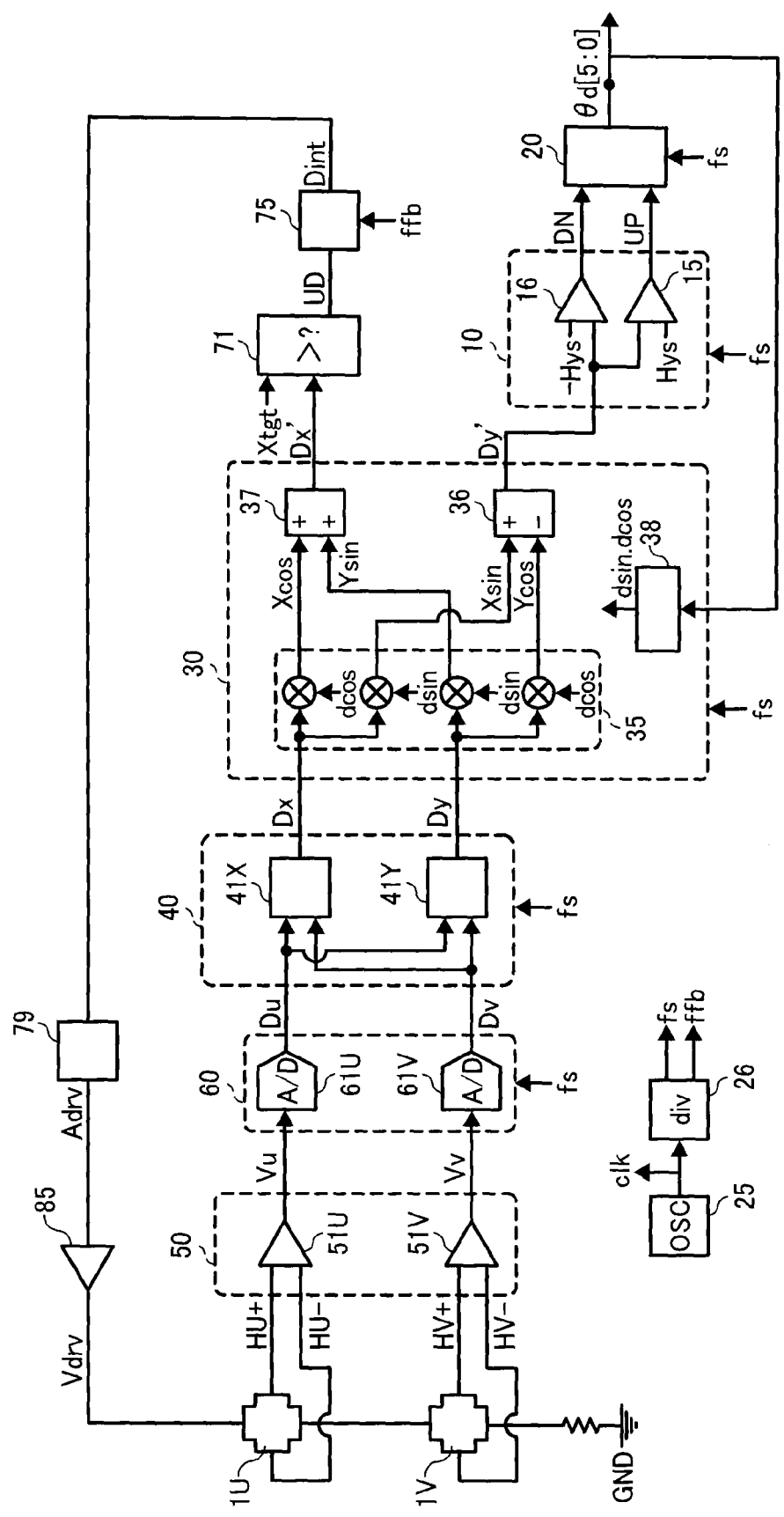
FIG. 12 is a schematic diagram illustrating the entire configuration of an angle detection device according to a second embodiment of the present invention.

FIG. 12 is a schematic diagram illustrating an entire configuration of an angle detection device according to the second embodiment.

The Hall elements 1U and 1V, the sign determining unit 10, the angle counter 20, the oscillator 25, the frequency divider 26, the comparison unit 71, the differential unit 50, the AD converter 60, the rotation calculating unit 30, the integration unit 75, and the vector generating unit 40 are the same as those of the first embodiment. The description of these are omitted.

Figure 13:
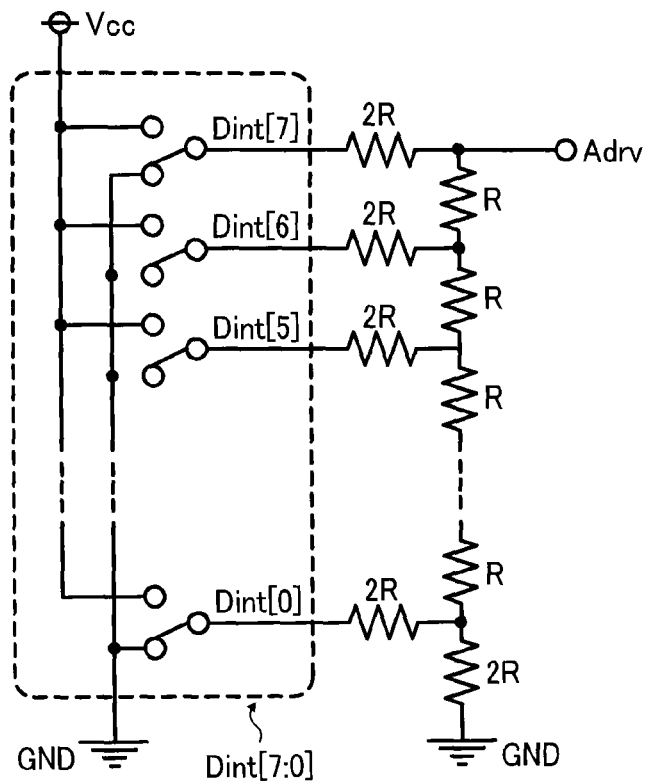
FIG. 13 is a diagram illustrating an example of configuration of the DA unit according to the second embodiment of the present invention.

A DA (digital/analogue) unit 79 outputs the drive control signal Adrv−, which is a voltage in proportion to the value of the integrated value Dint. DA unit 79 is an R-2R type DA converter. As illustrated in FIG. 13 (illustrating an example of configuration of the DA unit in the second embodiment), it is configured of multiple switches and ladder resistances.

Figure 14A:
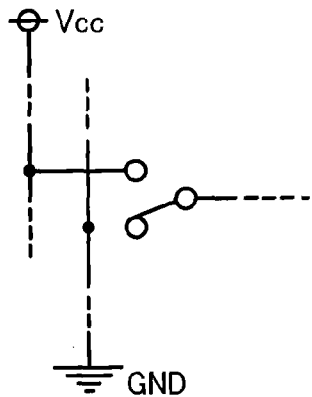
FIGS. 14A and 14B are diagrams illustrating the switching operation of the DA unit according to the second embodiment of the present invention.
Figure 14B:
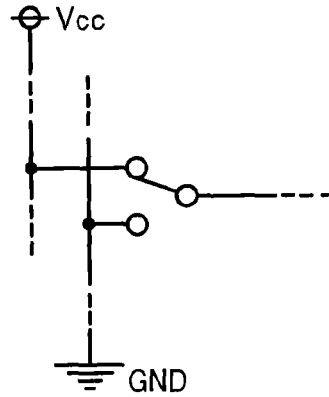

The multiple switches are provided for each bit (eight in this case) of the integrated value Dint. As illustrated in FIGS. 14A and 14B (diagrams illustrating switching operation of the DA unit in the second embodiment), when the value of each bit is 0, the circuit is connected to a ground GND (see FIG. 14A) and, when the value is 1, the switch is thrown to the source power Vcc (see FIG. 14B). According to this configuration, the drive control signal Adrv is as the Equation 15.

To attenuate the glitch of the DA unit 79, an LPF may be added.

The DA unit 79 in the present embodiment corresponds to the DA device in the present disclosure.

$$Adrv = Vcc * Dint/256 \qquad \text{Equation 15}$$

Figure 15:
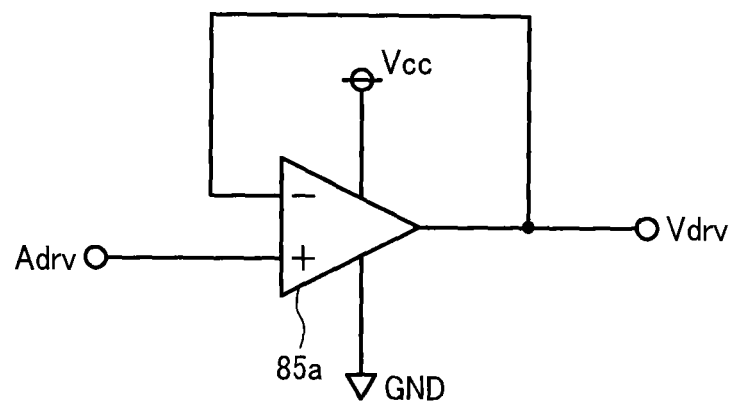
FIG. 15 is a diagram illustrating an example of configuration of the drive unit according to the second embodiment of the present invention.

The drive unit 85 is a voltage follower circuit using an amplifier 85a having a configuration illustrated in FIG. 15 (diagram illustrating an example of the configuration of the drive unit in the second embodiment) and supplies electricity to drive the Hall elements 1U and 1V. The drive voltage Vdrv having the same voltage as the drive control signal Adrv is output to supply a large amount of electric current to the Hall elements 1U and 1V due to impedance conversion.

The drive unit 85 in this embodiment corresponds to the sensor driving device for use in the present disclosure.

The angle detection device of the second embodiment is as described above. That is, the angle detection device is configured to control the amplitude of a sinusoidal signal by increasing or decreasing the drive voltage Vdrv of the Hall elements 1U and 1V based on the integrated value of the errors between the amplitude of the sinusoidal signal and the target amplitude value. This obviates the need of a circuit to cancel an input offset, so that the amplitude mentioned above is inexpensively controlled.

In addition, when the sensitivity of the Hall elements 1U and 1V and the magnetization of a permanent magnet is small, it is possible to prevent a decrease of the amplitude of a sinusoidal signal, so that the impact of external noises in wiring is significantly reduced.

In addition, since the integration device is made by simple logic circuits, the amplitude of a sinusoidal signal is inexpensively controlled.

Third Embodiment

A configuration of the angle detection device of a third embodiment is described below with reference to accompanying drawings.

Incidentally, the same explanation as those of the first embodiment is omitted.

First, the configuration of the angle detection device in the third embodiment is the same as FIG. 1 for the first embodiment.

That is, the Hall elements 1U and 1V, the sign determining unit 10, the angle counter 20, the oscillator 25, the frequency divider 26, the comparison unit 71, the differential unit 50, the AD converter 60, the rotation calculating unit 30, the integration unit 75, the drive unit 85, and the vector generating unit 40 are the same as those of the first embodiment.

The modulation unit 78 modulates the integrated value Dint by pulse density, which is output as a pulse signal Pls. This is described next.

Figure 16:
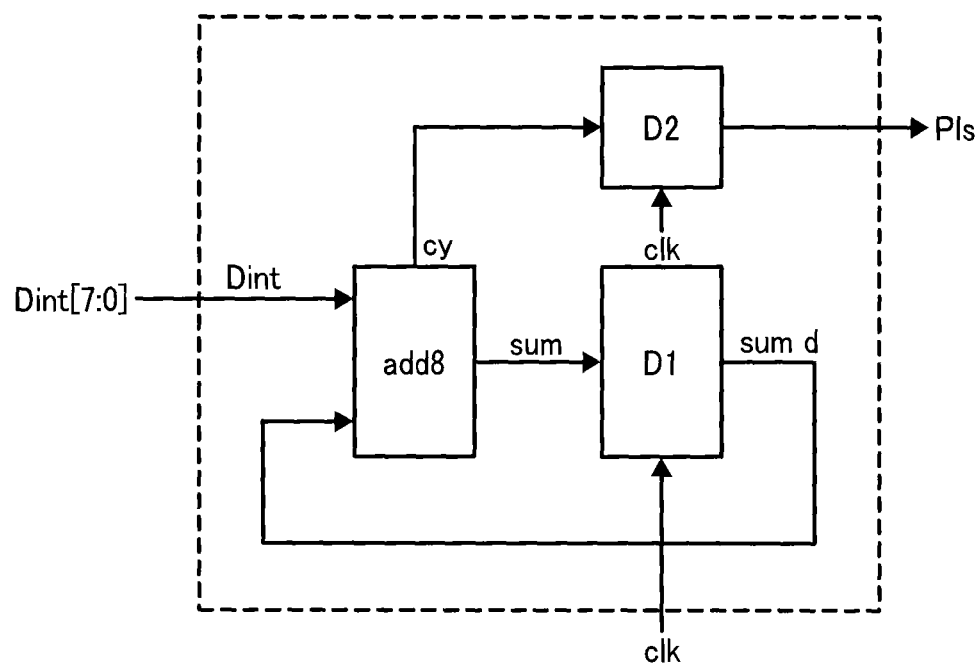
FIG. 16 is a diagram illustrating a block diagram of a modulation unit according to a third embodiment of the present invention.
Figure 17A:
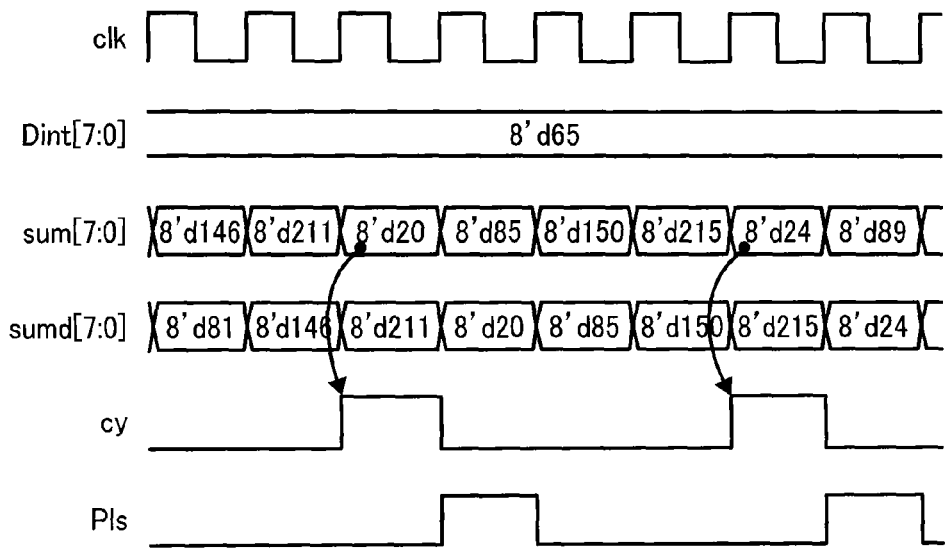
FIG. 17A is a diagram illustrating pulse density modulation of the modulation unit according to the third embodiment and FIG. 17B is a timing diagram illustrating the operation of the modulation unit.
Figure 17B:
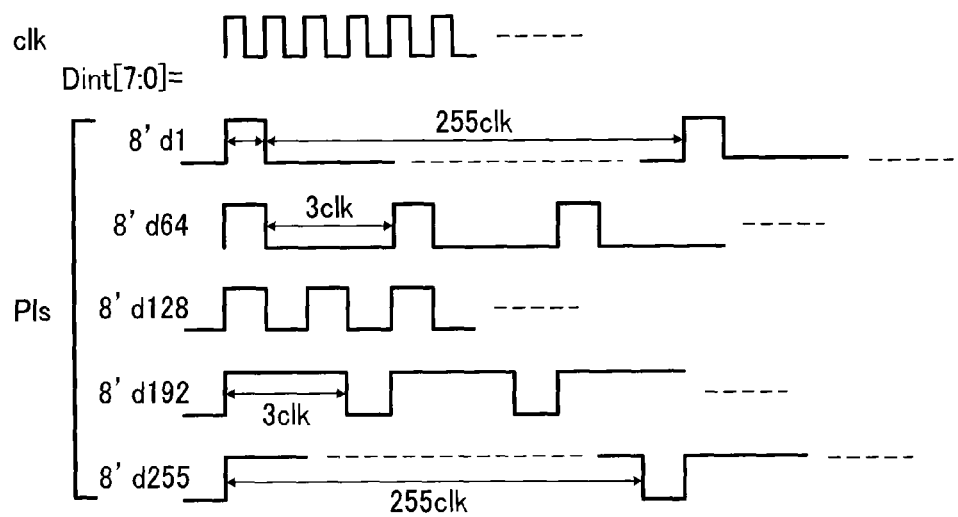

FIG. 16 is a block diagram illustrating the configuration of the modulation unit 78 according to the third embodiment. FIG. 17A is a timing diagram illustrating the pulse density modulation of the modulation unit in the third embodiment and FIG. 17B is a timing diagram illustrating the operation of the modulation unit.

The modulation unit 78 has an 8-bit adder add 8 and two delays D1 and D2.

As illustrated, the 8-bit adder add8 adds the integrated value Dint to a latch added value sumd and outputs the low 8 bit of the addition result as the added value sum. Incidentally, the word lengths of the integrated value Dint and the latch added value sumd are both 8 bits. When the addition result surpasses 8 bits, that is, in the case of a digit carry, a carry cy is output as High.

The first delay D1 outputs the added value sum as the latch added value sumd every time the clock clk arrives. The second delay D2 outputs the carry cy as the pulse signal Pls every time the clock clk arrives. That is, in FIG. 17A, 65 is shown as an example of the integrated value Dint and 81, 146, 211, etc., are shown as examples of sumd. If 65 as the integrated value Dint is added to, for example, 211 of sumd, which makes 276. The addition result surpasses 8 bit (256) and requires a digit carry, thereby generating the carry cy, so that Pls is generated via the delay D2. The sum at the time becomes 20 as a result of the generation of the carry cy.

Similarly, in FIG. 17B, for example, when the integrated value Dint is 128, one of the two clk periods has High for the pulse signal Pls and, the rest, Low. Consequently, the pulse density is ½. In addition, for example, when the integrated value Dint is 192, three of the four clk periods have High for the pulse signal Pls (which is counted as three pulses) and, the rest, Low. Consequently, the pulse density is ¾.

As described above, the modulation unit 78 converts the integrated value Dint into the pulse density (number of pulses per unit of time) of the pulse signal Pls and outputs it. That is, the pulse density is in proportion to the integrated value Dint.

The modulation unit 78 is as described above and corresponds to the modulation device in the present disclosure.

The low pass filter (LPF) 81 smooths the pulse signal Pls and outputs it as a drive control signal Adrv. The drive control signal Adrv is represented by the Equation 16 using a Hi level voltage Vcd of the pulse signal Pls. Even when the pulse frequency is the slowest (the integrated value Dint is 1, 255, etc.), the cutoff frequency is set to sufficiently attenuate the pulse signal.

$$Adrv = Vcd*Dint/256 \qquad \text{Equation 16}$$

The LPF 81 in the present embodiment corresponds to the smoothing device in the present disclosure.

The angle detection device of the third embodiment is as described above. As described above, in the present embodiment, based on the integrated value of the errors between the amplitude of a sinusoidal signal and a target amplitude value, the amplitude of the sinusoidal signal is controlled by increasing or decreasing the drive voltage Vdrv of the Hall elements 1U and 1V. This obviates the need of a circuit to cancel an input offset, so that the amplitude mentioned above is inexpensively controlled.

In addition, when the sensitivity of the Hall elements 1U and 1V and the magnetization of a permanent magnet is small, it is possible to prevent a decrease of the amplitude of a sinusoidal signal, so that the impact of external noises in wiring is significantly reduced.

In addition, since the integration device and modulation device are made by simple logic circuits, the amplitude of a sinusoidal signal is inexpensively controlled.

Embodiments of the present disclosure are as described above and summarized as below.

1. Since the amplitude of a sinusoidal signal is controlled by increasing or decreasing the drive voltage of a magnet sensor based on the integrated value of the errors between the amplitude of the sinusoidal signal and the target amplitude value, a circuit to cancel an input offset is made unnecessary. In addition, the amplitude is inexpensively controlled to a constant level and when the sensitivity of a magnet sensor and the magnetization of a permanent magnet is small, it is possible to prevent a decrease of the amplitude of a sinusoidal signal, so that the impact of external noises in wiring is significantly reduced.

2. In addition, since the modulation device is made by simple logic circuits, the amplitude of a sinusoidal signal is inexpensively controlled to a constant level.

3. Without a complicated calculation such as arc tangent, the rotation angle described above can be detected and an angle detection device can be inexpensively made without increasing the size of circuits.

According to the present invention, an angle detection device and an angle detection method are provided which are capable of detecting a rotation angle of a rotating body free from cost increase and errors, by increasing and decreasing a drive voltage of a Hall element to correct the error of amplitude of an output signal with no additional circuit provided unlike conventional technologies.

What is claimed is:

1. An angle detection device that detects a rotation angle of a rotating body that includes a permanent magnet, the angle detection device comprising:
   multiple magnetic sensors to detect a magnetic field caused by rotation of the rotating body and that to output voltages in proportion to the detected magnetic field, the output voltages forming multiple sinusoidal signals having different phases according to the rotation angle of the rotating body;

a rotation calculation device to detect the rotation angle based on the multiple sinusoidal signals and to detect an amplitude of the multiple sinusoidal signals to output the amplitude of the multiple sinusoidal signals as an amplitude signal;

an amplitude comparison device to compare the amplitude signal with an amplitude target value and to output an amplitude error signal indicating a comparison result; and an amplification circuit that applies a drive voltage, to the multiple magnetic sensors, that corrects the multiple sinusoidal signals, wherein the drive voltage applied by the amplification circuit is increased or decreased based on the amplitude error signal.

2. The angle detection device according to claim 1, further comprising:

an integration device to output an integrated signal in which a state of the amplitude error signal is integrated as predetermined time and value, wherein the amplification circuit increases or decreases the drive voltage applied to the multiple magnetic sensors based on the integrated signal.

3. The angle detection device according to claim 2, further comprising:

a modulation device to modulate the integrated signal to a pulse-like signal and output the pulse-like signal as a pulse signal; and a smoothing device to smooth the pulse signal to be output as a drive control signal to the amplification circuit, wherein the amplification circuit applies the drive voltage based on the drive control signal.

4. The angle detection device according to claim 2, further comprising:

a digital/analog (DA) device to convert the integrated signal to an analog signal and output the analog signal as a drive control signal to the amplification circuit, wherein the amplification circuit applies the drive voltage based on the drive control signal.

5. The angle detection device according to claim 3, wherein the modulation device conducts pulse density modulation to the integrated signal to be output as the pulse signal.

6. The angle detection device according to claim 2, wherein when the state of the amplitude error signal is that the amplitude signal is less than the amplitude target value, the integration device counts up the integrated signal, and when the state is that the amplitude signal is not less than the amplitude target values, the integration device counts down the integrated signal.

7. The angle detection device according to claim 1, further comprising:

a vector generating device to generate a vector based on the multiple sinusoidal signals, wherein the rotation calculation device comprises:

a vector rotation device to rotate the vector according to detected angle data;

a sign determining device to determine whether the vector rotated is positioned in a positive direction or in a negative direction against a predetermined reference value and to output a result as a sign determination signal; and an angle counter to increase or decrease a count value based on the sign determination signal and to output the count value as a detected angle signal.

8. An angle detection method for detecting a rotation angle of a rotating body that includes a permanent magnet, the angle detection method comprising:

detecting the rotation angle of the rotating body based on voltages, output by multiple magnetic sensors, that form multiple sinusoidal signals having different phases, the multiple magnetic sensors detecting a magnetic field caused by rotation of the rotating body and that output the voltages in proportion to the detected magnetic field;

detecting an amplitude of the multiple sinusoidal signals and outputting the amplitude of the multiple sinusoidal signals as an amplitude signal;

comparing the amplitude signal with an amplitude target value and outputting an amplitude error signal indicating a result of the comparison; and applying a drive voltage, by an amplification circuit to the multiple magnetic sensors, that corrects the multiple sinusoidal signals, wherein the drive voltage applied by the amplification circuit is increased or decreased based on the amplitude error signal.

9. The angle detection method according to claim 8, further comprising:

outputting an integrated signal in which a state of the amplitude error signal is integrated as predetermined time and value, wherein the drive voltage applied by the amplification circuit is increased or decreased based on the integrated signal.

10. The angle detection method according to claim 9, further comprising:

modulating the integrated signal to a pulse-like signal and outputting the pulse-like signal as a pulse signal; and smoothing the pulse signal to be output as a drive control signal to the amplification circuit, wherein the amplification circuit applies the drive voltage based on the drive control signal.

11. The angle detection method according to claim 9, further comprising:

converting the integrated signal to an analog signal and outputting the analog signal as a drive control signal to the amplification circuit, wherein the amplification circuit applies the drive voltage based on the drive control signal.

12. The angle detection method according to claim 10, wherein the modulating includes conducting pulse density modulation to the integrated signal to be output as the pulse signal.

13. The angle detection method according to claim 9, wherein when the state of the amplitude error signal is that the amplitude signal is less than the amplitude target value, the integrated signal is counted up, and when the state is that the amplitude signal is not less than the amplitude target values, the integrated signal is counted down.

14. The angle detection method according to claim 8, further comprising:

generating a vector based on the multiple sinusoidal signals, wherein the detecting the rotation angle includes:
   rotating the vector according to detected angle data;
   determining whether the vector rotated is positioned in a positive direction or in a negative direction against a predetermined reference value;
   outputting a result as a sign determination signal;
   increasing or decreasing a count value based on the sign determination signal;
   outputting the count value as a detected angle signal.

15. An angle detection device, comprising:
   a plurality of hall effect sensors that output a plurality of sinusoidal signals;
   a rotation angle calculation circuit configured to
      detect a rotation angle of a rotating body based on the plurality of sinusoidal signals,
      detect an amplitude of the plurality of sinusoidal signals, and
      output an amplitude signal that represents the amplitude of the plurality of sinusoidal signals;
   an amplitude comparison circuit configured to output an amplitude error signal that indicates a result of comparing the amplitude signal with an amplitude target value; and
   an amplification circuit that applies a drive voltage to the plurality of hall effect sensors, wherein
   the drive voltage is increased or decreased based on the amplitude error signal.

16. The angle detection device according to claim 15, further comprising:
   an integration device to output an integrated signal in which a state of the amplitude error signal is integrated as predetermined time and value, wherein
   the amplification increases or decreases the drive voltage applied to the plurality of hall effect sensors based on the integrated signal.

17. The angle detection device according to claim 16, further comprising:
   a modulation device to modulate the integrated signal to a pulse-like signal and output the pulse-like signal as a pulse signal; and
   a smoothing device to smooth the pulse signal to be output as a drive control signal to the amplification circuit, wherein
   the amplification circuit applies the drive voltage based on the drive control signal.

18. The angle detection device according to claim 16, further comprising:
   a digital/analog (DA) device to convert the integrated signal to an analog signal and output the analog signal as a drive control signal to the amplification circuit, wherein
   the amplification circuit applies the drive voltage based on the drive control signal.

19. The angle detection device according to claim 16, wherein
   when the state of the amplitude error signal is that the amplitude signal is less than the amplitude target value, the integration device counts up the integrated signal, and
   when the state is that the amplitude signal is not less than the amplitude target values, the integration device courts down the integrated signal.

20. The angle detection device according to claim 15, further comprising:
   a vector generating circuit configured to generate a vector based on the multiple sinusoidal signals, wherein
   the rotation angle calculation circuit is further configured to:
      rotate the vector according to detected angle data;
      determine whether the vector rotated is positioned it a positive direction or in a negative direction against a predetermined reference value;
      output a result as a sign determination signal;
      increase or decrease a count value based on the sign determination signal; and
      output the count value as a detected angle signal.

* * * * *